United States Patent
Jensen et al.

[11] Patent Number: 5,351,934
[45] Date of Patent: Oct. 4, 1994

[54] PROPORTIONAL SOLENOID VALVE

[75] Inventors: Ron B. Jensen, Mesa; James R. Guyuax, Chandler, both of Ariz.

[73] Assignee: Alliedsignal, Inc., Morris Township, Morris County, N.J.

[21] Appl. No.: 991,020

[22] Filed: Dec. 15, 1992

[51] Int. Cl.⁵ .............................................. F16K 31/08
[52] U.S. Cl. ................................. 251/65; 251/129.1;
251/129.21; 335/229
[58] Field of Search ............... 251/65, 129.01, 129.08,
251/129.09, 129.1, 129.15, 129.21; 335/229,
230, 232, 233, 235, 234

[56] References Cited

U.S. PATENT DOCUMENTS

| | | | |
|---|---|---|---|
| 2,279,243 | 4/1942 | Parsons | 251/129.01 |
| 2,579,723 | 12/1951 | Best | 251/129.01 |
| 3,007,672 | 11/1961 | Tischler | 251/129.01 |
| 3,125,321 | 3/1964 | Van Domelen | 251/129.01 |
| 3,321,177 | 5/1967 | Fendel et al. | 251/210 |
| 3,502,105 | 3/1970 | Ernyei et al. | 137/599 |
| 4,004,258 | 1/1977 | Arnold | 335/17 |
| 4,299,252 | 11/1981 | Reinicke | 251/65 X |
| 4,538,129 | 8/1985 | Fisher | 251/65 X |
| 4,541,429 | 9/1985 | Prosl et al. | 251/129.21 X |
| 4,564,046 | 1/1986 | Lungu | 251/65 X |
| 4,598,736 | 7/1986 | Chorkey | 251/129.03 X |
| 4,614,327 | 9/1986 | Valbjorn et al. | 251/129.21 X |
| 4,621,788 | 11/1986 | Delew et al. | 251/129.21 X |
| 4,690,371 | 9/1987 | Bosley et al. | 251/65 |
| 4,829,947 | 5/1989 | Lequesne | 251/129.1 X |
| 4,890,815 | 1/1990 | Hascher-Reichl et al. | 251/65 X |
| 4,988,074 | 1/1991 | Najmolhoda | 251/65 X |
| 5,083,747 | 1/1992 | Schmitt-Matzen | 251/129.21 |
| 5,108,070 | 4/1992 | Tominaga | 251/129.1 X |

FOREIGN PATENT DOCUMENTS 1221443 3/1986 U.S.S.R.

Primary Examiner—Martin P. Schwadron
Assistant Examiner—Kevin L. Lee
Attorney, Agent, or Firm—Joseph R. Black; Robert A. Walsh

[57] ABSTRACT

A permanent magnet, proportional solenoid valve having a suspended armature which is separated from two opposing pole pieces by two normally unequal gaps having a collectively constant dimension. The magnetic field originating from the magnet extends through the gaps and is used to bias the armature to a position at which the valve is normally closed.

13 Claims, 1 Drawing Sheet

ABOUT THIS PAGE

PROPORTIONAL SOLENOID VALVE

TECHNICAL FIELD

The present invention relates generally to solenoid valves and more specifically to those which employ a permanent magnet and one or more coils in combination to control the position of an armature. Still more specifically, the invention relates to such valves that are designed to provide for flow modulation by selectively positioning the armature within its range of movement.

BACKGROUND OF THE INVENTION

Attempts have been made to develop effective proportional solenoid valves suitable for use in flow modulation. In such applications, a key problem is nonlinearity of the relationship between applied force and displacement for the armature and attendant mass which is moved in order to provide flow modulation. This has led to designs such as those exemplified by U.S. Pat. No. 4,690,371 Bosley et al in which pressure sensing arrangements and feedback circuits are employed to compensate for thenonlinearity.

An approach different from the forementioned designs is disclosed in U.S. Pat. No. 4,988,074 Najmolhoda. In the '074 patent, an armature 22 is suspended by two plate springs 24, 26, and a coil spring 42 is used to bias the armature in a direction which renders the valve normally closed. The force exerted by the coil spring 42 must be sufficient to overcome both the magnetomotive force exerted on the armature by a permanent magnet 34 and the force exerted on the same by the pressurized fluid with which the valve operates. In many applications, this approach is unsatisfactory for reasons which will become evident from the following description.

An objective of the invention is to provide a proportional solenoid valve exhibiting highly linear response over the range of movement associated with its armature, spool, or other flow modulating element.

A further objective of the invention is to provide such a valve with relatively small radial dimensions.

A still further objective is to provide a solenoid valve that operates in a manner which is substantially independent on the pressure of the fluid which flows through the valve.

SUMMARY OF THE INVENTION

The invention is a permanent-magnet, proportional solenoid valve having a suspended armature which is separated from two opposing pole pieces by two normally unequal gaps having a collectively constant dimension, whereby the magnetic field originating from the magnet extends through the gaps and is used to bias the armature to a position at which the valve is normally closed, and wherein the electromagnetic field created by current flow through two commonly wound coils produces an additive effect on the flux density in one of the gaps while producing a subtractive effect on the flux density in the other gap, the armature moving away from the closed position in response to the additive and subtractive effects and to a degree which depends on the current flow through the coils.

For reasons explained below, the armature is preferably suspended by a combination of bellows structures which exert opposed biasing forces on the armature.

DESCRIPTION OF THE PREFERRED EMBODIMENT

Figures 1, 2:
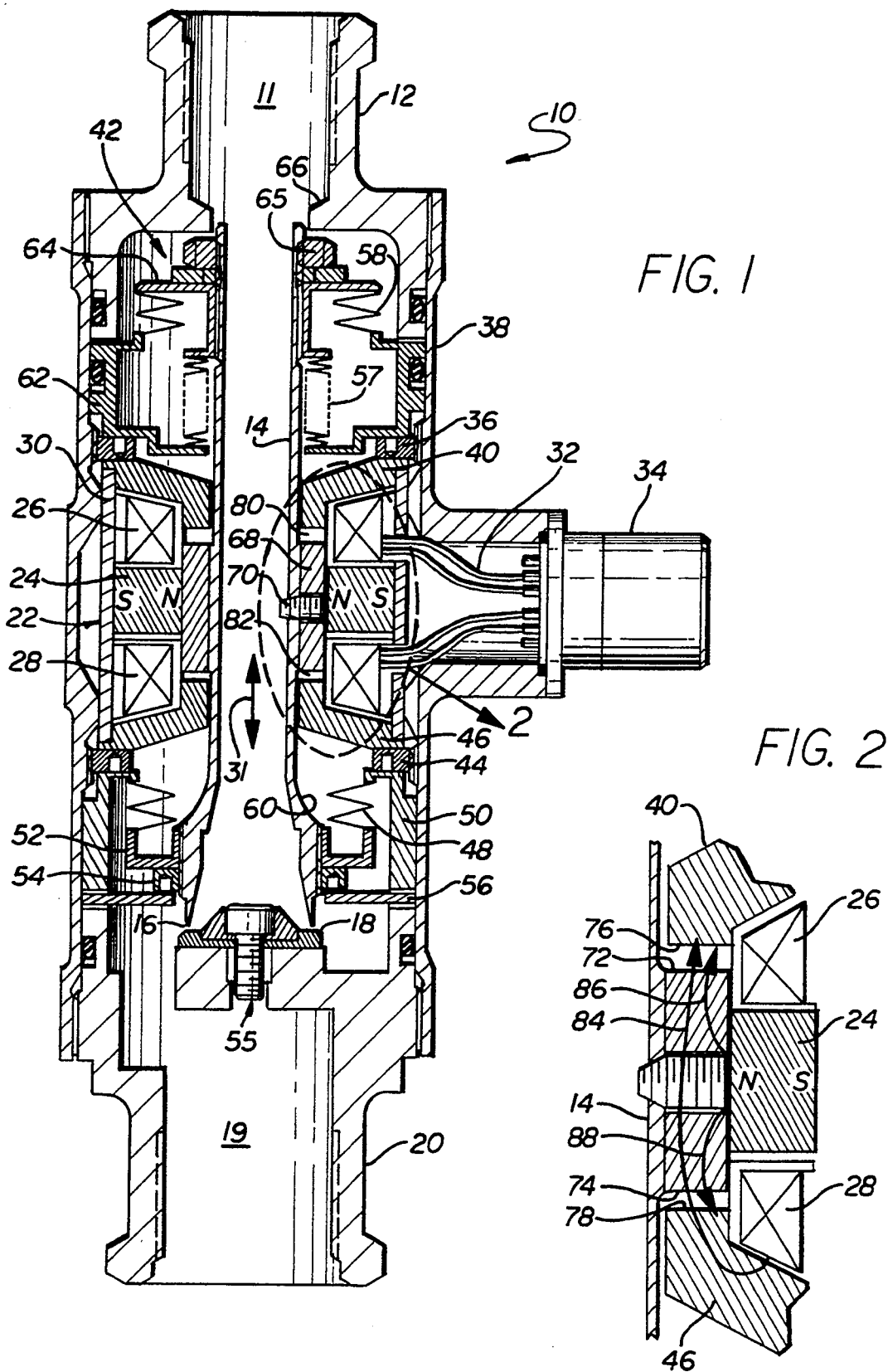
FIG. 1 is a cross-sectional and partially schematic view of a solenoid valve in accord with the preferred embodiment. Rear surfaces are not illustrated.
FIG. 2 is an enlarged view of the area circled in FIG. 1.

In FIG. 1, the number 10 designates a solenoid valve. In use of the valve 10, fluid enters via a channel 11 formed through an inlet port 12, flows axially through a popper member 14 (hereinafter, "poppet") and through an annular orifice defined by a clearance 16 between the poppet and a valve seat 18, and exits the valve via a channel 19 formed through an outlet port 20. Accordingly, when the valve 10. is open, the poppet 14 serves to modulate flow to a degree which depends on the clearance 16.

A magnetic subassembly 22 is comprised of a permanent magnet 24 interposed between two wire coils 26, 28. In the illustrated embodiment, the subassembly 22 is captured in a ferromagnetic jacket 30 to form a structurally integral unit. Alternatively, the magnet 22 and coils 26,28 can be arranged as shown and the portion of the flux path provided by the jacket 30 can be incorporated in the housing structure of the valve 10, or the entire arrangement can be such that a harmlessly small gap is provided between the housing structure and the magnet/coil combination.

The essentially annular magnet 24 is constructed in a conventional manner by providing a plurality of rectangular magnets sandwiched between wedge-shaped sections of an aluminum cage. The cage maintains the magnets in proper positional relation so that the north and south poles are radially inward and outward, respectively, with reference to an axis 31 defined by the subassembly 22.

The coils 26, 28 are wound in a common direction for reasons described below. Leads (as at 32) extend from the coils 26, 28 to a connector 34 through which the coils are connected in series. The connector 34 forms an electromechanical interface between the valve 10 and an external circuit which in use controls the position of the poppet 14 via pulse-width modulation.

An interior ring nut 36 is threadedly engaged with the main housing member 38 and defines the axial positions of a first pole piece 40 and a compound bellows structure 42. Another interior ring nut 44 is threadedly engaged with the housing member 38 and defines the axial positions of a second pole piece 46 and another bellows structure 48. The latter bellows structure 48 serves to radially center the poppet 14, and also to provide a desired spring rate as explained below. The bellows are extended so that the structure 48 biases the poppet 14 away from the valve seat 18. The bellows structure 48 comprises a radially outer member 50 which abuts the ring nut 44, and a radially inner member 52 which is threadedly engaged with the poppet 14. A retaining nut 54 fixes the position of the radially inner member 52 relative to the poppet 14. An annular disc 56 is captured between the radially outer member 50 and the outlet port 20, the latter being threadedly engaged with the main housing member 38. The disc 56 cooperates with the retaining nut 54 to limit downward movement of the poppet 14 in order to prevent damage to the valve seat 18. The valve seat 18 is connected to the outlet port 20 by a bolt and washer combination 55 as illustrated.

The compound bellows structure 42 has a small-diameter bellows 57 and a large-diameter bellows 58. The smaller bellows 57 has an effective diameter equal to that of the large-diameter portion 60 of the poppet 14. This serves the purpose of pressure balancing the poppet 14 so that the latter is substantially unresponsive to variations in fluid pressure. The larger bellows 58 serves the same two purposes as the bellows structure 48, and is also extended (i.e. is in tension). Therefore, unlike the bellows structure 48, the bellows 58 biases the poppet 14 toward the valve seat 18. The compound bellows structure 42 has a radially outer member 62 that abuts the ring nut 36, and a radially inner member 64 threadedly engaged with the poppet 14. A retaining nut 65 threadedly engaged with the poppet 14 cooperates with an inner flange 66 formed on the inlet port 12 to limit movement of the poppet in the upward direction, as viewed in FIG. 1. The inlet port 12 is threadedly engaged with the main housing member 38.

Referring now to FIGS. 1 and 2, a ferromagnetic armature 68 is rigidly connected to the poppet 14 by a set screw 70. The annular armature 68 has opposing ends 72, 74 and defines the same axis 31 as the subassembly 22.

It will be observed that the ferromagnetic pole pieces 40, 46 extend in a radially inward direction and then in an axial direction to form opposing annular faces 76, 78. A first gap 80 is defined by the separation between the annular face 76 of the first pole piece 40 and the one annular end 72 of the armature 68. A second gap 82 is defined by the separation between the annular face 78 of the second pole piece 46 and the other annular end 74 of the armature 68. These gaps 80, 82, and thus the position of the poppet 14, are illustrated in FIG. 1 as they would be in the absence of the magnetomotive force originating from the magnet 24 and applied to the armature 68. Thus, the gaps 80, 82 and the clearance 16 between the poppet 14 and valve seat 18 represent conditions attributable to the forces applied by the bellows structures 42, 48, and the positional interrelationship of the various structural elements of the valve 10 absent the magnet 24. As is evident from the drawings, the first gap 80 under these conditions is larger than the second gap 82. When the effect of the magnet 24 is added, the associated flux density is higher in the second gap 82 than in the first gap 80, and the armature 68 moves downward until the poppet 14 abuts the valve seat 18. Accordingly, the valve 10 is normally closed. In the closed condition, the second gap 82 is maintained as such (i.e. there is still a gap between the face 78 and end 74 of the pole piece 46 and the armature 68, respectively), but is smaller than illustrated in the drawings.

The coils 26, 28 are wound in a direction to ensure that when current flows through the coils, the electromagnetic flux (represented by arrow 84) attributable to the coils is, in the first gap 80, additive to the magnetic flux 86 attributable to the magnet 24. However, in the second gap 82, the flux 84 detracts from the flux 88 attributable to the magnet 24. The net effect is that the overall flux density becomes greater in the first gap 80 than in the second 82, and the armature 68 responds by moving to narrow the first gap while widening the second. The valve 10 is thus opened to a degree which depends on the pulse width of the signals applied to the coils, and which is limited by the range of movement permitted by the retaining nut 64. When the opening movement of the poppet 14 is thus limited, the first gap 80 is maintained as such, but becomes smaller than the second gap 82.

The invention can be practiced with the use of alternative structure which is functionally equivalent to that described above. For example, the poppet 14 and valve seat 18 could be replaced with a spool which variably opens a lateral channel. Moreover, the bellows 48, 58 could be replaced with a variety of conventional biasing mechanisms. Helical springs can be substituted but are not favored because of friction and potential buckling. Plate-type springs can be substituted (especially for bellows 58) but are not favored because, in order to provide a relatively uniform spring rate over the required stroke of the poppet 14, the diameter of the spring would be very large compared to the diameter of the bellows structure.

Accordingly, the illustrated embodiment of the invention is intended to serve a pedagogical purpose. The necessarily limited range of design options described above is not intended to limit the scope of the invention more than is just and proper in view of the teaching contained herein.

What is claimed is:

1. A solenoid valve having an inlet and an outlet for a fluid which is to flow through the valve; the valve comprising in combination:

a first pole piece;

a second pole piece spaced from the first;

an armature defining a longitudinal axis thereof; the armature being interposed between and spaced from the pole pieces as determined by reference to the axis such that a first gap is formed between the armature and the first pole piece, and a second gap is formed between the armature and the second pole piece;

a valve seat relatively proximal to the second gap and relatively distal from the first gap;

modulating means rigidly connected to or integral with the armature for cooperating with the valve seat to alternatively prevent or permit fluid flow from the inlet to the outlet; the modulating means having first and second ends relatively proximal to the inlet and outlet, respectively;

a permanent magnet circumscribing the armature and being interposed between the pole pieces as determined by reference to the axis; the second gap being narrower than the first whereby flux density attributable to the magnet is greater in the second gap than in the first gap and the armature is operative, in response to magnetomotive force originating from the magnet, to urge the second end of the modulating means into abutment with the valve seat so that the valve is normally closed; the second gap being further narrowed and the first gap correspondingly widened when the armature is thus subjected to the magnetomotive force originating from the magnet; and electromagnetic means for cooperating with the permanent magnet to move the modulating means in response to current flow; the electromagnetic means being operable to increase flux density in the first gap and simultaneously decrease flux density in the second gap sufficiently to move the modulating means away from the valve seat to a distance which renders the first gap narrower than the second gap while maintaining a clearance between the armature and the first pole piece.

2. A solenoid valve as recited in claim 1 wherein the electromagnetic means comprises first and second coils connected in series; the magnet being interposed between the coils as determined by reference to the axis.

3. A solenoid valve as recited in claim 1 wherein the electromagnetic means comprises first and second coils; the coils being wound in a common direction and the magnet being interposed between the coils as determined by reference to the axis.

4. A solenoid valve as recited in claim 3 further comprising first biasing means for impeding displacement of the modulating means toward the valve seat, the magnetomotive force being sufficiently large to overcome impedance attributable to the first biasing means so that the valve is normally closed.

5. A solenoid valve as recited in claim 4 further comprising second biasing means, independent on the magnetomotive force exerted by the permanent magnet, for impeding displacement of the modulating means away from valve seat.

6. A solenoid valve as recited in claim 4 wherein the first biasing means comprises a bellows structure connected to the modulating means.

7. A solenoid valve as recited in claim 5 wherein the second biasing means comprises a bellows structure connected to the modulating means.

8. A solenoid valve as recited in claim 6 wherein the second biasing means comprises a bellows structure connected to the modulating means.

9. A solenoid valve as recited in claim 1 further comprising first biasing means for impeding movement of the modulating means toward the valve seat; the magnetomotive force exerted by the permanent magnet being sufficiently large to overcome impedance attributable to the first biasing means.

10. A solenoid valve as recited in claim 9 further comprising second biasing means for impeding movement of the modulating means away from the valve seat.

11. A solenoid valve as recited in claim 9 wherein the first biasing means comprises a bellows structure connected to the modulating means.

12. A solenoid valve as recited in claim 10 wherein the second biasing means comprises a bellows structure connected to the modulating means.

13. A solenoid valve as recited in claim 12 wherein the first biasing means comprises a bellows structure connected to the modulating means.

* * * * *